Patented July 3, 1945

2,379,605

UNITED STATES PATENT OFFICE 2,379,605

BENZYL CELLULOSE COATING COMPOSITIONS

Robert C. Swain, Riverside, and Pierrepont Adams, Stamford, Conn., assignors to American Cyanamid Company, New York, N. Y., a corporation of Maine No Drawing. Application September 20, 1940, Serial No. 357,611

4 Claims. (Cl. 260—15)

This invention relates to coating compositions containing benzyl cellulose and melamine-formaldehyde resin.

An object of this invention is to improve the physical and chemical properties of benzyl cellulose coating compositions, e. g., light stability, color, etc.

Another object of this invention is to improve the physical properties of coating compositions containing melamine-formaldehyde resins.

Still another object of this invention is to provide compositions containing benzyl cellulose and compatible proportions of compatible melamine-formaldehyde resins.

These and other objects are attained by blending benzyl cellulose with not more than about an equal proportion of a melamine-formaldehyde resin which has been alkylated with an alcohol selected from the group consisting of propyl and octyl alcohols, and wherein the molal ratio of formaldehyde to melamine is at least about 4:1.

The following examples in which the proportions are in parts by weight are given by way of illustration and not in limitation.

Example 1

| | Parts |
|---|---|
| Melamine-formaldehyde resin "A" | 10 |
| Benzyl cellulose | 90 |

A composition containing these ingredients is prepared by admixing 20 parts of melamine-formaldehyde resin "A" solution (50% resin) with 450 parts of "Benzyl cellulose stock solution" (containing 20% of benzyl cellulose, 16% of ethanol (formula 2B anhydrous) and 64% of xylene). Films of the composition are applied to metal objects and baked at a temperature of about 135° C. for about one-half hour. The product is a hard, transparent coating having good film strength.

Example 2

| | Parts |
|---|---|
| Melamine-formaldehyde resin "A" | 25 |
| Benzyl cellulose | 75 |

A composition containing these ingredients is prepared by admixing 50 parts of melamine-formaldehyde resin "A" solution (50% resin) with 375 parts of "Benzyl cellulose stock solution." Films of the composition are applied to metal objects and baked at a temperature of about 135° C. for about one-half hour. A clear, tough film is formed.

Example 3

| | Parts |
|---|---|
| Melamine-formaldehyde resin "A" | 50 |
| Benzyl cellulose | 50 |

A composition containing these ingredients is prepared by admixing 100 parts of melamine-formaldehyde resin "A" solution (50% resin) with 250 parts of "Benzyl cellulose stock solution." Films of the composition are applied to metal objects and baked at a temperature of about 135° C. for about one-half hour. The product formed is a very hard, clear coating.

Example 4

| | Parts |
|---|---|
| Melamine-formaldehyde resin "B" | 10 |
| Benzyl cellulose | 90 |

A composition containing these ingredients is prepared by admixing 20 parts of melamine-formaldehyde resin "B" solution (50% resin) with 450 parts of "Benzyl cellulose stock solution." Films of the composition are applied to metal objects and baked at a temperature of about 135° C. for about one-half hour. A water-white film having good chemical properties is formed.

Example 5

| | Parts |
|---|---|
| Melamine-formaldehyde resin "B" | 25 |
| Benzyl cellulose | 75 |

A composition containing these ingredients is prepared by admixing 50 parts of melamine-formaldehyde resin "B" solution (50% resin) with 375 parts of "Benzyl cellulose stock solution." Films of the composition are applied to metal objects and baked at a temperature of about 135° C. for about one-half hour. A hard, transparent film is produced.

Example 6

| | Parts |
|---|---|
| Melamine-formaldehyde resin "B" | 50 |
| Benzyl cellulose | 50 |

A composition containing these ingredients is prepared by admixing 100 parts of melamine-formaldehyde resin "B" solution (50% resin) with 250 parts of "Benzyl cellulose stock solution." Films of the composition are applied to metal objects and baked at a temperature of about 135° C. for about one-half hour, to give a smooth, transparent finish.

Example 7

The composition of Example 3, preferably with about 1 part of phosphoric acid or acid ester thereof added, is applied to wood and baked at aobut 80° C. for about 1-4 hours. A hard, clear lacquer finish is obtained.

Example 8

The composition of Example 3 may be mixed with about an equal proportion of a fatty oil modified phthalic glyceride resin and the resulting mixture is emulsified in water. This emulsion may be applied to cloth or paper either as a finishing material, sizing material or in textile printing processes. The resin may be cured by subjecting the coated or impregnated material to a temperature of about 135° C. for several minutes.

Example 9

The composition of Example 3 is applied to paper or cloth aas a coating or impregnating composition and it is subjected to a temperature of about 135° C. for 3 minutes or until completely cured. Various textile finishes and paper finishes may be produced in this manner as well as articles suitable for use as insulating materials.

Example 10

Paper or cloth sheets are impregnated with the composition of Example 6 and the impregnated sheets are dried, cut if desired, stacked and pressed under hot platens under a pressure of about 2000 pounds per square inch to yield laminated materials of high strength and having good electrical properties.

The melamine-formaldehyde resins vary slightly according to minor variations in control during their production and in some instances small proportions of a suitable solvent material, e. g., the monoethyl ether of ethylene glycol ("Cellosolve"), acetone, ethyl acetate, etc., may be added to the original solutions of benzyl cellulose and melamine-formaldehyde resin in order to produce perfectly clear solutions if such solutions are not originally obtained.

*Preparation of melamine-formaldehyde resin "A"*

| | Parts |
|---|---|
| Melamine-formaldehyde (molal ratio 1:4) spray-dried powder | 300 |
| n-Propanol | 1200 |
| Methyl acid phosphate | 3 |

The melamine-formaldehyde condensation product is obtained by refluxing melamine and formalin (37% formaldehyde in water) in the molal ratio of 1:4 at a pH of about 7-9 for about 3 hours and then spray-drying.

The spray-dried melamine-formaldehyde powder, propanol and methyl acid phosphate are heated to about 90° C. in 40 minutes and refluxed about 30 minutes. This solution is vacuum concentrated at about 50-60° C. until 767 parts of volatile material are distilled off. The resin solution thus formed contains about 48% solids.

*Preparation of melamine-formaldehyde resin "B"*

| | Parts |
|---|---|
| Melamine-formaldehyde (molal ratio 1:4) spray-dried powder | 200 |
| n-Octanol | 280 |
| n-Butanol | 320 |
| Methyl acid phosphate | 4 |

The melamine-formaldehyde condensation product is obtained by refluxing melamine and formalin (37% formaldehyde in water) in the molal ratio of 1:4 at a pH of about 7-9 for about 3 hours and then spray-drying.

The spray-dried melamine-formaldehyde powder, octanol, butanol and methyl acid phosphate are heated to about 100-105° C. in 30 minutes and refluxed about 30 minutes. This solution is vacuum concentrated at about 50-70° C. to form a product containing about 50% solids.

Alkylated melamine-formaldehyde resins may be produced in accordance with the procedures outlined above, as well as in any other suitable manner. Aqueous syrups of melamine-formaldehyde resins may be first produced and then alkylated either simultaneously with dehydration or subsequent to dehydration. Furthermore, melamine and formaldehyde may be condensed simultaneously with a suitable alcohol. In order to facilitate the alkylation with the octanols, a low boiling alcohol such as methanol or butanol may be mixed with the octanol, thereby assisting in removing the water and causing the reaction to take place readily at somewhat lower temperatures than would otherwise be required. The low boiling alcohol is removed by distillation after the reaction is completed. Another method for producing resins alkylated with octanols is to alkylate the melamine-formaldehyde resin with a low boiling alcohol, such as methanol and subsequently replacing it with the desired octanol, distilling out the low boiling alcohol. The condensation may be carried out either with or without an acid catalyst and in some instances basic catalysts may desirably be utilized.

While formaldehyde has been used in the previous examples, it will be obvious that other aldehydes such as the various polymers of formaldehyde, e. g., paraformaldehyde or substances which yield formaldehyde may be used in place of part or all of the formaldehyde used in the above examples.

The molal ratio of formaldehyde to melamine is preferably approximately 4:1. Substantially lower ratios than this are not compatible with the propylated and octylated melamine-formaldehyde resins but ratios of formaldehyde higher than 4:1 may be employed, e. g., up to 6:1 or even higher. While higher ratios of formaldehyde to melamine than 6:1 may be used, it is generally undesirable inasmuch as formaldehyde is lost during the curing so that the product in its cured condition does not contain more than about 6 mols of formaldehyde to 1 mol of melamine.

Although the straight chain propyl and octyl alcohols are preferred for alkylating the melamine-formaldehyde resins, isomers of each of these alcohols may be used as well as various mixtures of propyl alcohols or octyl alcohols. Furthermore, in some instances it may be desirable to utilize mixtures of propyl and octyl alcohols. The term "alkylated melamine-formaldehyde resin" is intended to denote compositions which are reacted with an alcohol.

Compositions made according to the present invention have much better color and light stability than benzyl cellulose compositions not containing melamine-formaldehyde resins. On the other hand, the electrical properties of benzyl cellulose are largely retained. The compositions are quite heat resistant and have especially good alkali resistance, acid resistance and water resistance. Benzyl cellulose which is soluble in alcohol and dioxane and to a lesser extent in toluene is rendered substantially insoluble in these materials if substantial amounts of the melamine-formaldehyde resin be present. Accordingly, such compositions find wide use in coating applications where damage by solvents is likely.

Our products may be plasticized with a wide variety of materials such as the alkyl phthalates, tricresyl phosphate, various alkyd resins, particularly the fatty acid oil modified alkyd resins, etc.

Desirable compositions are produced by admixing 1 part of a soyabean oil modified phthalic glyceride alkyd resin with an equal part of one of our mixtures of benzyl cellulose and melamine-formaldehyde resin.

Various fillers, pigments, dyes and lakes may be added to our compositions, e. g., lithopone, zinc oxide, titanium oxide, ferric oxide, Prussian blue, toluidine red, malachite green, mica, glass fibers, ground glass, powdered silica, etc.

Curing catalysts may be incorporated in the compositions to effect a more rapid curing of the melamine-formaldehyde resins or to enable the resin to be cured at lower temperatures than indicated in the above examples. Such substances are, for instance, phosphoric acid, ammonium salts of phosphoric acid, etc.

Other resinous compositions may be included in various coating compositions, e. g., urea-formaldehyde resins, phenol-formaldehyde resins, ethyl cellulose, cellulose acetate, nitrocellulose, etc.

Our compositions are especially suitable for use in lacquers, paints and enamels, as well as in printing inks. They are particularly suitable for application in insulating lacquers.

Obviously many modifications and variations in the processes and compositions described above may be made without departing from the spirit and scope of the invention as defined in the appended claims.

We claim:

1. A coating composition containing one part of benzyl cellulose and not more than about an equal part of a melamine-formaldehyde resin which has been reacted with an alcohol selected from the group consisting of propyl and octyl alcohols wherein the molal ratio of formaldehyde to melamine is at least about 4:1.

2. A coating composition containing one part of benzyl cellulose and not more than about an equal part of a melamine-formaldehyde resin which has been reacted with n-propyl alcohol and wherein the molal ratio of formaldehyde to melamine is about 4:1.

3. A coating composition containing one part of benzyl cellulose and not more than about an equal part of a melamine-formaldehyde resin which has been reacted with n-octyl alcohol and wherein the molal ratio of formaldehyde to melamine is about 4:1.

4. A coating composition containing one part of benzyl cellulose and not more than about an equal part of a melamine-formaldehyde resin which has been reacted with an alcohol selected from the group consisting of propyl and octyl alcohols wherein the molal ratio of formaldehyde to melamine is between about 4:1 and about 6:1.

ROBERT C. SWAIN.
PIERREPONT ADAMS.